March 21, 1967 H. DA SILVA 3,310,627

TELECOMMUNICATION SYSTEM FOR PRODUCING SERVICE SIGNALS

Filed June 17, 1963

INVENTOR.
H. DA SILVA

BY Hugh A. Kirk

ATTORNEY

United States Patent Office 3,310,627

Patented Mar. 21, 1967

3,310,627
TELECOMMUNICATION SYSTEM FOR PRODUCING SERVICE SIGNALS

Herman da Silva, Voorburg, Netherlands, assignor to De Staat der Nederlanden, ten deze Vertegenwoordigd Door de Directeur-Generaal der Posterijen, Telegrafie en Telefonie, The Hague, Netherlands Filed June 17, 1963, Ser. No. 288,328
Claims priority, application Netherlands, June 29, 1962, 280,405
12 Claims. (Cl. 178—113)

ABSTRACT OF INVENTION

Figure 1:
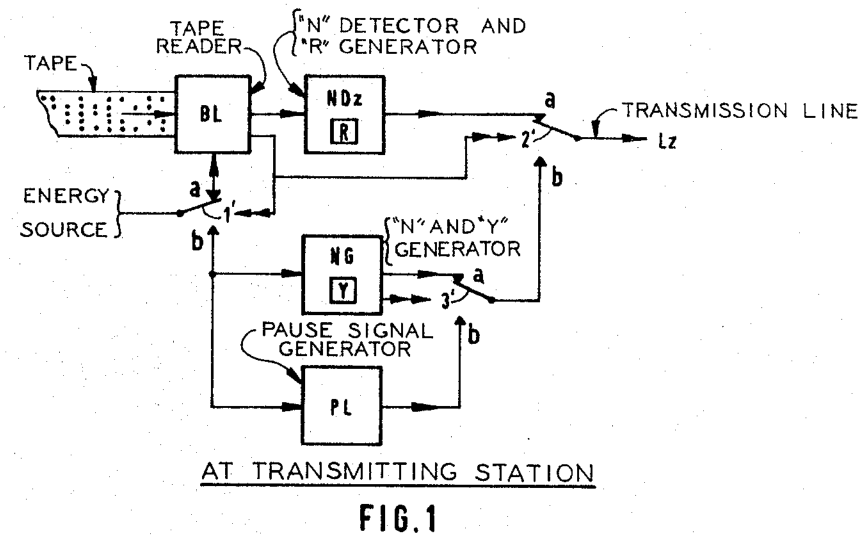

When traffic is led via a channel by means of a code in which all the variations are used as traffic signals, the need for giving service signals is often felt. Thinking of the normal five-units code, i.e. the international telegraph alphabet No. 2, one knows that all its variations are used, in the letters state as well as in the figures state.

The invention provides further variations in such a channel, if at the transmitting station this channel comprises a point at which signals arrive from a source before being led to the transmitter, and at the receiving station a corresponding point, from which signals are led further to the receiver.

At these points according to the invention, devices are inserted, serving for varying the traffic flow in time, particularly for temporarily stopping it, if one or more service signals are to be transmitted from the transmitter to the receiver. The relevant instruction and the effect, respectively, passes to or from the relevant said points at the transmitting station and at the receiving station via separate paths provided for the purpose, since, as has been observed already, the traffic supply and removal channels are already fully charged with traffic.

At the transmitter, according to the invention, the arrival of an instruction to give service signals entails the interruption of the traffic flow at the said point, said service signal, indicated by a recognition signal, being formed by letter signals belonging to the normal traffic arranged in an infrequently used combination, followed by an inserted letter indicating whether the said recognition signal must be considered as belonging to normal traffic or that it must serve exclusively for switching over from the traffic meaning to the service meaning of the further signals to be transmitted from the transmitter to the receiver via the channel.

Switching-over in the opposite direction can take place normally by means of a signal of the service signal group only serving this purpose.

Among the said service signals there may be e.g. addresses of texts to be given before the text.

Thus e.g. in telegraph traffic coded according to the five-units alphabet known as CCITT code No. 2, or some other five-units binary code, all the 32 combinations of which contain traffic information, the end of the message is marked by sending e.g. four times the combination of the symbol "N" after the last signals are transmitted. Another possibiilty consists in marking a pause signal by one of the five-units combinations. For the latter case too, the combination N-method could be applied four times, with the definition that defined signals received afterwards represent the pause condition, which, through a second defined combination, serves as the beginning of a next message.

In this case the supposition must be started from that the configuration "NNNN" does not occur in normal traffic transmission. This is a limitation for the user, and may be important when transmitting coded messages. If with such a system, however, data transmission is employed, there is a real chance of an "NNNN" configuration occurring, because the signals to be transmitted are often results obtained from a computer, in which results any signal combination is as probable as any other. Thus, in such a system, protecting test signals should be added after the transmission of any information signal or long block, where end of the block must be marked.

The means according to the invention work discriminatingly for an end-of-message or a block signal configuration, and for a similar signal configuration belonging to the traffic information.

DESCRIPTION OF INVENTION

(A) *Objects and advantages*

Accordingly it is an object of the system of the present invention to provide service signals in a code in which all of the variations are already used by traffic signals.

Another object is to provide such a system for transmitting and receiving a service signal in a code of traffic signals by employing an infrequently used combination of signals for the service signal, which combination is immediately followed by a recognition signal also selected from said code.

Another object is to produce such a system in which such an infrequently used combination of signals for a service signal may also be followed immediately by a discriminating signal in the event said combination may also be a combination of traffic signals that is to be communicated.

Another object is to provide such a system in which such special recognition and distinguishing signals may be automatically eliminated from the received traffic signal processor, as well as the special service signal itself, if desired.

Still another object is to provide such a system in which said predetermined combination of signals to indicate a specal service signal may be regenerated in the transmitting part of the system when it is to be followed by the proper recognition signal.

Another object is to produce such a system in which the special service signal is an end-of-message signal, and may be followed by another special signal for indicating idle time or a pause.

Still another object of this invention is to provide a special signal for starting the system when the special idle time or pause signals are being transmitted.

(B) *Brief description of views*

Figure 2:
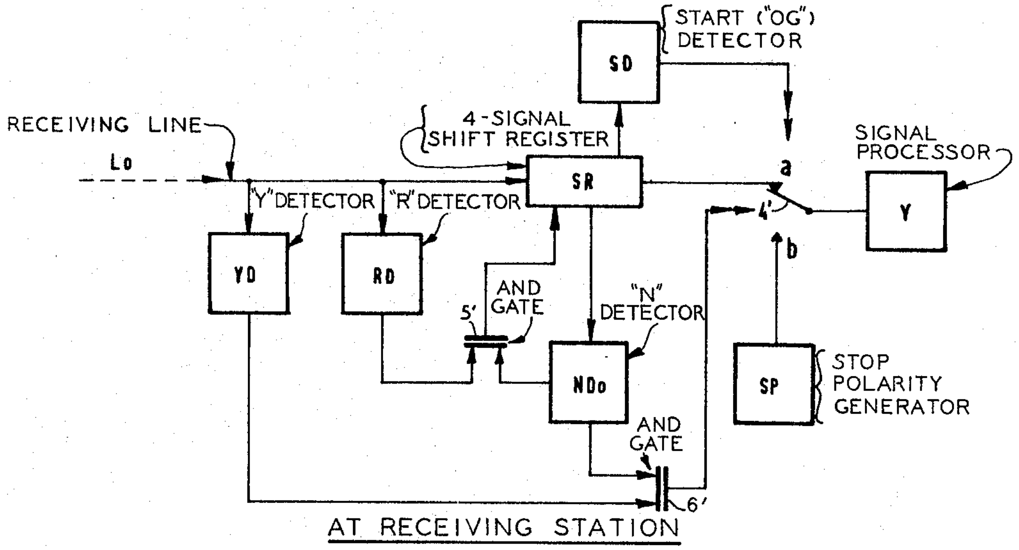

The above mentioned and other features and objects of this invention and the manner of attaining them will become more apparent and the invention itself will be understood best by reference to the following description of an embodiment of the invention taken in conjunction with the accompanying drawing, wherein:

FIG. 1 is a schematic block wiring diagram of a transmitting station for generating and detecting the special service signals immediately followed by a recognition or distinguishing signal according to this invention; and FIG. 2 is a schematic block wiring diagram of a receiving station for detecting the special service signals transmitted from the station of FIG. 1, and for automatically eliminating the recognition and distinguishing signals generated in said transmitting station.

When the transmitting station (FIG. 1) detects a preselected service signal configuration as belonging to the message information, a defined variation e.g. containing the symbol "R," is sent after the transmission of this configuration.

When the receiving station (FIG. 2) detects this configuration, but recognizes in the next signal the symbol "R", it adds this service signal configuration to the traffic information.

This discriminating symbol "R" is then ignored as traffic information, whereas the signals following this combination are considered as traffic signals as a matter of course.

If the service or end-of-massage signal configuration is really an addition made by the transmitting station to signal that the message has finished, a second defined combination, e.g. the symbol "Y," is transmitted after this configuration, after which further defined signals act as pause signals, or are followed by test signals.

When the receiving station detects the said signal configuration followed by the second defined signal (the symbol or combination for Y), the end-of-message/block signal configuration (according to a predetermined scheme) is indicated, and this configuration may or may not be added to the message. The confirming symbol "Y," however, is ignored and further received signals are considered as pause signals or are treated as test signals, as desired.

(I) AT TRANSMITTING STATION

In the block diagram of the transmitting station according to FIG. 1 information is supplied to the tape reader BL in the shape of a five-units perforated tape T. When there is a message in the tape reader BL, the contact (*a*) of the power or energy source switch 1' is closed as shown in full lines. Then the tape reader operates and transmits the information which passes the N-detector (NDz), and via the switch 2' in the state (*a*) keys the line (Lz).

*Case 1*

It is supposed that the end-of-message criterion is the combination "NNNN," and further that the combination "NNNNR" happens to occur in the combination. The NDz detects the 4×"N" signal, so that the transmission of information is stopped for the duration of one signal and the discriminating symbol "R" is automatically inserted to indicate that these 4 N's are not to indicate end-of-message/block signal configuration. The switch 2 remains in the position (*a*). In that case the signals on the line appear in the following sequence:

(Case 1)

| R | R | N | N | N | N |
|---|---|---|---|---|---|
| 6 | 5 | 4 | 3 | 2 | 1 |

the signals numbered 1 2 3 4 being the N combination, the signal 5 the inserted R symbol and the signal 6 the R symbol belonging to the information.

*Case 2*

If the message is supposed to end in "XYZ," this combination is normally transmitted, but after the transmission of the symbol Z, the switches 1' and 2' take the state (*b*). (The double pointed arrows in FIGS. 1 and 2 indicate the course of the influences of the circuits BL, NG and SD to operate the contacts of the sitches 1', 2', 3', and 4'.) As a result of this, a series of 4×N is generated in the N-generator (NG) and the symbol "Y" is added. Then the signal series "NNNNY" is transmitted via the switch 3' in the state (*a*) and the switch 2' in the state (*b*). After the transmission of the "Y" the switch 3' is also put in the state (*b*), due to which the pause signal generator PL continues to transmit "letters" combinations having the meaning of pause signals.

The series of signals on the line looks as follows then:

| L | L | L | L | Y | N | N | N | N | Z | Y | X |
|---|---|---|---|---|---|---|---|---|---|---|---|
| 12 | 11 | 10 | 9 | 8 | 7 | 6 | 5 | 4 | 3 | 2 | 1 |

(Case 2) in which the symbols 1, 2, 3 belong to the information, then the signals 4, 5, 6 and 7 (the combination N) prepare the end of the message, and finally the combination 8 ("Y") definitively announces the end of the message, after which the signals 9–12 (letters "L" or "LET") act as pause signal.

*Case 3*

When now a next message is laid-in, the switches 1', 2', and 3' assume the state (*a*) again and the signal "unperforated tape" (comb. 32 of CCITT alphabet No. 2) is transmitted before the message begins.

Suppose the message following the pause begins as follows: L A B C D, then the transmission on the line will look as follows:

| C | B | A | LET | OG | LET | LET |
|---|---|---|---|---|---|---|
| 7 | 6 | 5 | 4 | 3 | 2 | 1 |

(Case 3) in which the signals 1 and 2 are the pause signals ("LET"); the combination "OG," the third signal (3), announces that a fresh message follows; and the signals 4, 5, 6 and 7 are the signals of the message.

*Case 4*

If the message following the pause is e.g. "OG ABC," the transmission on the line will look as follows (Case 4):

| C | B | A | OG | OG | LET | LET |
|---|---|---|---|---|---|---|
| 7 | 6 | 5 | 4 | 3 | 2 | 1 |

What has been said of Case 3 applies here too.

(II) AT RECEIVING STATION

FIG. 2 gives the block diagram of the receiver. The signals from the receiving line Lo are stored in a four-signal shift register SR. These signals are passed with a four signals' delay from the shift register via the switch 4 in the state (*a*) to the signal processing equipment V. When the Cases 1, 2, 3 and 4 described before are considered, the course of events is seen to be as follows:

*Case 1*

The signal on the line Lo is:

| N | N | N | N | R | R |
|---|---|---|---|---|---|
| 1 | 2 | 3 | 4 | 5 | 6 |

After four signals the four combinations "N" are found in the shift register SR. Then the N-detector NDo detects this combination and prepares the end of the message. At the same time the fifth signal ("R"), detected in the R-detector RD, indicates that this end-of-message combination belong to the information.

The co-operating NDo and RD via AND gate 5' controls the device so that the discriminating signal, the combination "R," is not stored in the shift register SR, or, if it has been stored, that it is obliterated or provided with a "not to be handled" criterion. The switch 4' remains in the poistion *a*. So the following series is offered to the signal processing device V:

| N | N | N | N | R |
|---|---|---|---|---|
| 1 | 2 | 3 | 4 | 6 |

(Thus the discriminating signal 5 has been eliminated.)

*Case 2*

The signal on the line Lo is

| X | Y | Z | N | N | N | N | Y | L | L | L | L |
|---|---|---|---|---|---|---|---|---|---|---|---|
| 1 | 2 | 3 | 4 | 5 | 6 | 7 | 8 | 9 | 10 | 11 | 12 |

Again after four signals the 4–N combinations are found in the shift register SR. The N detector NDo detects the preparations of the end of the message again. Then, however, the Y detector YD becomes active and, in co-operation with the detector NDo via AND gate 6', puts the switch 4' in the position (*b*). The stop polarity generator SP then constantly supplies stop polarity to the signal processing device V, so that it remains blocked. So device V is provided with the XYZ-stop criterion.

*Case 3*

If the signal on the line Lo is

| LET | LET | OG | LET | A | B | C |
|---|---|---|---|---|---|---|
| 1 | 2 | 3 | 4 | 5 | 6 | 7 |

the 3rd signal ("OG"), when having reached the last position of the shift register, will cause the start detector SD to operate the switch 4. Then when the "OG" combination has left the shift register SR, switch 4′ is put back into its position (*a*) again. Considered backwards the shift register SR is seen to contain the signals

LET ABC which signals are now applied to the processing device V.

*Case 4*

If the signal on the line Lo is built up as follows:

| LET | LET | OG | OG | A | B | C |
|---|---|---|---|---|---|---|
| 1 | 2 | 3 | 4 | 5 | 6 | 7 |

an action identical to that of Case 3 just above will occur, though after the change-over of the switch 4′ from (*b*) to (*a*), the signals O G A B C are found in the shift register, which signals are then applied to the processing device in this order.

Suitable delays are inserted in the various paths to make the said working possible.

As has been explained above, any infrequently used combination of signals can be used as a service signal, which is immediately followed by a recognition signal. If the infrequently used combination occurs in the traffic, it is immediately followed by a distinguishing signal.

A signal formed in the above-mentioned way can be used as an end-of-message signal; it can also be used for other purposes. Thus a service signal formed in this manner can be inserted in the middle of the transmission of traffic to give service information; after the service information the transmission of traffic can be resumed, initiated by a simple distinguishing signal ("R"). In the example worked out the letter "Y" (Case 2 above) is used to indicate that the preceding infrequently used combination "N N N N" is meant as a service signal.

The invention is not tied to these signals. Another combination may serve for the infrequently used combination, and another signal than "Y" or "XYZ" may serve for the recognition signal.

The same thing applies to the signal "LET" or "L" chosen as pause signal and the signal "OG" chosen for the start announcing.

Further, according to the invention the number of signals in the service signal may be reduced to one signal followed by a recognition signal.

While I have illustrated and described what I regard to be the preferred embodiment of my invention, nevertheless it will be understood that such is merely exemplary and that numerous modifications and rearrangements may be made therein, without departing from the essence of the invention.

What is claimed is:

1. In a telecommunication system for transmitting and receiving traffic code signals between two stations, in which all of the signals in said code are already employed for traffic, the improvement comprising the method of producing at least one special service signal of an infrequently used combination of said traffic signals, comprising the steps of:

(A) selecting a specific infrequently used combination of said traffic signals for indicating end-of-message, (B) selecting two different additional signals to be sent immediately after said specific combination signal to discriminate said combination from traffic signals, and to recognize said combination as an end-of-message service signal, respectively, (C) transmitting said selected combination of signals immediately followed by one of said different additional signals, and (D) detecting said selected transmitted signals at the receiving station for correspondingly controlling said receiving station.

2. A method according to claim 1 including the step of:

(E) selecting a still different signal to indicate a pause used after said end-of-message signal.

3. A method according to claim 2 including the step of (F) selecting a further different signal for use after said pause signal to indicate start-of-message.

4. A method according to claim 1 including the step of (E′) discriminating between traffic combination signals and said end-of-message combination signal at each station.

5. A system for transmitting and receiving service signals in a code in which all the combinations in said code are already employed as traffic signals, said service signals comprising at least one infrequently used preselected combination of traffic signals followed by a preselected different traffic signal as a recognition signal, said system comprising:

(I) a transmitting station for said signals having:

(A) means (ND*z*) to detect said preselected combination signal and to generate and transmit a different signal as a recognition signal to follow immediately after said combination signal when said combination signal is part of said traffic, (B) means (NG) to generate and transmit said preselected combination signal followed by a second recognition signal when an end-of-message is to be indicated; and (II) a receiving station for receiving said signals having:

(A) means (ND*o*) for detecting said preselected combination signal, (B) means (RD or YD) for separately detecting said followed recognition signals, and (C) means (5′, 6′, 4′) responsive to said detecting means for controlling the receipt of said traffic signals in accordance with said detected signals.

6. A system according to claim 5 wherein said transmitting station includes:

(I)(C) means (PL) to generate and transmit at least one other service signal after transmission of said generated preselected combination signal.

7. A system according to claim 6 wherein said receiving station includes:

(II)(D) means (SD) to detect said other service signals for controlling said receiving station in accordance therewith.

8. A system according to claim 6 wherein one of said other service signals is a pause signal.

9. A system according to claim 8 wherein another of said other service signals is a start signal which may be transmitted after said pause signal.

10. A system according to claim 5 wherein said receiving station includes:

(II)(D) means (RD) for separately detecting and ignoring said discriminating signal following said preselected combination signal.

11. A system according to claim 5 wherein said service signal of said preselected combination of traffic signals is an end-of-message signal which may be inserted anywhere between traffic signals.

12. A system for transmitting and receiving service signals in a code in which all the combinations in said code are already employed as traffic signals, said service signals comprising at least one infrequently used preselected combination of traffic signals followed by a preselected different traffic signal as a recognition signal, said system comprising:

(I) a transmitting station for said signals having:

(A) means (BL) for reading said traffic signals to be transmitted, (B) means (NDz) to detect said preselected combination signal and to generate and transmit a different signal as a recognition signal to follow immediately after said combination signal when said combination signal is part of said traffic, (C) means (NG) to generate and transmit said preselected combination signal followed by a second recognition signal when said reading means indicates said traffic signals are to be terminated; and (D) means (PL) to generate and transmit at least one other service signal after transmission of said generated preselected combination signal; and (II) a receiving station for receiving said signals having:

(A) means (ND*o*) for detecting said preselected combination signal, (B) means (RD and YD) for separately detecting said followed recognition signals, (C) means (5′, 6′, 4′) responsive to said detecting means for controlling the receipt of said traffic signals in accordance with said detected signals, and (D) means (SD) to detect said other service signals for controlling said receiving station in accordance therewith.

References Cited by the Examiner

UNITED STATES PATENTS

| | | | |
|---|---|---|---|
| 1,745,008 | 1/1930 | Colman | 178—113 |
| 1,966,386 | 7/1934 | Haglund | 178—3 |

NEIL C. READ, *Primary Examiner.*

T. A. ROBINSON, *Assistant Examiner.*